United States Patent
Akahori

(10) Patent No.: US 8,817,846 B2
(45) Date of Patent: Aug. 26, 2014

(54) DIVERSITY RECEPTION DEVICE AND DIVERSITY RECEPTION METHOD

(75) Inventor: Hiroji Akahori, Tokyo (JP)

(73) Assignee: LAPIS Semiconductor Co., Ltd., Tokyo (JP)

( * ) Notice: Subject to any disclaimer, the term of this patent is extended or adjusted under 35 U.S.C. 154(b) by 259 days.

(21) Appl. No.: 13/210,105

(22) Filed: Aug. 15, 2011

(65) Prior Publication Data

US 2012/0045025 A1    Feb. 23, 2012

(30) Foreign Application Priority Data

Aug. 18, 2010  (JP) ................................. 2010-183070

(51) Int. Cl.
- *H04B 1/00* (2006.01)
- *H04B 7/08* (2006.01)
- *H04L 25/03* (2006.01)
- *H04L 27/26* (2006.01)
- *H04L 25/02* (2006.01)

(52) U.S. Cl.
CPC .... *H04B 7/0857* (2013.01); *H04L 2025/03426* (2013.01); *H04L 27/2647* (2013.01); *H04L 25/03159* (2013.01); *H04L 25/022* (2013.01)
USPC ............................ 375/148; 375/316; 375/354

(58) Field of Classification Search
USPC ......................... 375/343, 346–350
See application file for complete search history.

(56) References Cited

U.S. PATENT DOCUMENTS

| 5,812,593 A | * | 9/1998 | Kaku | 375/150 |
| 2002/0072343 A1 | * | 6/2002 | Miyatani | 455/272 |
| 2007/0291827 A1 | * | 12/2007 | Hasegawa et al. | 375/148 |

FOREIGN PATENT DOCUMENTS

| JP | 2004-135120 A | 4/2004 |
| JP | 2006-203659 A | 8/2006 |
| JP | 2007-281827 A | 10/2007 |

OTHER PUBLICATIONS

An Office Action; "Notice of Reasons for Rejection," issued by the Japanese Patent Office on Feb. 18, 2014, which corresponds to Japanese Patent Application No. 2010-183070 and is related to U.S. Appl. No. 13/210,105; with English language translation.

* cited by examiner

*Primary Examiner* — Sam K Ahn
*Assistant Examiner* — Janice Tieu
(74) *Attorney, Agent, or Firm* — Studebaker & Brackett PC

(57) ABSTRACT

A diversity reception device includes branches, a controller and a combining section. Each branch includes a correlation section that generates a correlation signal that represents a correlation between a received signal and a delayed signal or between the received signal and a reference signal, where the correlation signal level disregarding the received signal level, a time position detector that detects time positions at which the level of the correlation signal is at a peak, a demodulation section that demodulates the received signal, and a multiplication section that multiplies the demodulated signal with a weighting factor. The controller controls the weighting factor on the basis of the respective levels of the correlation signals at the detected time positions. The combining section combines, by adding, the respective demodulated signals of the branches subsequent to the demodulated signal of each branch being multiplied with the weighting factor.

13 Claims, 9 Drawing Sheets

DIVERSITY RECEPTION DEVICE AND DIVERSITY RECEPTION METHOD

CROSS-REFERENCE TO RELATED APPLICATION

This application is based on and claims priority under 35 USC 119 from Japanese Patent Application No. 2010-183070 filed on Aug. 18, 2010, the disclosure of which is incorporated by reference herein.

BACKGROUND

1. Technical Field

The present invention relates to a diversity reception device with a plural number of branches and a diversity reception method.

2. Related Art

In recent years, orthogonal frequency division multiplexing (OFDM) modulation systems and the like have been employed as modulation systems for terrestrial digital broadcasting. In an OFDM system, symbols are transmitted using plural sub carriers (carrier waves) with different center frequencies. The meaning of the term "symbol" herein is intended to include a single set of data transmitted in one cycle of modulation. A symbol period is constituted by appending a guard period to an effective symbol period. In an OFDM system, the effect of multipath interference is suppressed by copying a portion of an effective symbol signal, which is the actual object of demodulation, and inserting this portion between effective symbol signals in the form of a repeating waveform. The period of this copied waveform is the guard period.

In an OFDM signal receiving device, in order to ameliorate effects from phasing and the like, a diversity system is employed. In this diversity system, plural antennas are provided and carriers are separately demodulated in branches corresponding with the respective antennas. Selection and weighted combining (hereinafter referred to as maximal-ratio combining) or the like of the individually demodulated carriers is executed with reference to reception levels (power levels of the received signals) or the like.

However, when carriers are weighted and combined in accordance with reception levels, the modulation results of branches with reception levels at which reception is not possible, which are actually unwanted, may be combined at large weightings. Thus, the demodulated signal may, contrary to expectation, be worsened and excellent maximal-ratio combining results may not be obtained.

For example, values converted from received signal strength indicator (RSSI) values generated by a tuner and tuner gain control values and the like may be used to represent reception levels and used for weighting in maximal-ratio combining. However, the gain control value applied to an amplifier in a tuner, which is an analog circuit, and the actual gain (i.e., how large the gain is controlled to be in practice) have an error difference. In a diversity receiver with plural branches, because there are differences in actual gains with respect to gain control of the tuners of the respective branches, it is difficult to implement excellent weighting by conversion from RSSI values, gain control values or the like. Further, if unwanted broadcasts or unwanted waves are input to a particular branch, the power level is increased by these unwanted waves in an amount corresponding to the unwanted waves, this is reflected in the gain control, and the combining may be applied with an erroneous weighting.

As a technology for controlling weightings in maximal-ratio combining, Japanese Patent Application Laid-Open (JP-A) No. 2004-135120 has disclosed a diversity reception device that is provided with an automatic gain control (AGC) section that controls the gain of a tuner at each branch, a fast Fourier transform (FFT) section, an equalization section that equalizes the FFT output signal, and a reliability calculation section. The reliability calculation section calculates a reliability value of the carrier from a pilot signal output by the equalization section. The reliability value is corrected by a reliability value correction section in accordance with output information from the AGC section. A carrier selecting and combining section selects and combines, with weightings, the carriers of the branches in accordance with the corrected reliability values.

However, in the diversity reception device recited in the above reference, because the reliability values (weightings) are found using pilot signals output from the equalization section, there is a problem with optimization of the weightings if there is a branch in a receiving condition in which the reception level of wanted waves that are required may not be guaranteed. For example, in this technology, with a received signal in which the wanted waves are weak and unwanted waves are large, the reliability value is found from the level of a pilot signal that has been FFT-processed and equalized. Therefore, the reliability value is affected by reception levels, and maximal-ratio combining with excellent weightings may not be possible.

SUMMARY

In consideration of the above, the present invention provides a diversity reception device and diversity reception method that may, in diversity reception with plural branches, combine demodulated signals of the branches with suitable weightings.

A first aspect of the present invention is a diversity reception device that includes plural branches, each branch including: a correlation section that generates a correlation signal that represents one of a correlation between a received signal and a delayed signal in which the received signal is delayed or a correlation between the received signal and a reference signal, a level of the correlation signal disregarding a level of the received signal; a time position detector that detects time positions at which the level of the correlation signal generated by the correlation section is at a peak; a demodulation section that demodulates the received signal; and a multiplication section that multiplies a demodulated signal demodulated by the demodulation section with a weighting factor; a controller that controls the weighting factor of the multiplication section of each branch on the basis of the respective levels of the correlation signals at the time positions detected by the time position detectors of the respective branches; and a combining section that combines, by adding, the respective demodulated signals of the branches subsequent to the demodulated signal of each branch being multiplied with the weighting factor controlled by the controller.

The correlation unit of the present aspect generates a correlation signal that is unrelated to the level of the received signal. Therefore, the receiving condition may be determined from the level of the correlation signal at a time position at which the correlation signal is at a peak (hereinafter referred to as the peak position), without being affected by the level of the received signal or the level of the demodulated signal. Accordingly, the present invention may suitably control weighting factors regardless of levels of received signals and levels of demodulated signals. That is, the resistance of detection to weakness of wanted waves and the like is relatively strong.

A second aspect of the present invention is the diversity reception device of the first aspect, in which each branch further includes: a time interval detector that detects a time interval between two successive time positions detected by the time position detector, for every two successive time positions; and a calculation section that calculates a difference from an ideal time interval for each of the detected time intervals, wherein the controller controls the weighting factor of the multiplication section of the each branch on the basis of the respective differences calculated by the calculation sections of the respective branches.

In the present aspect, because a weighting factor may be controlled by the period (time interval) of the time positions at which the correlation signal level is at peaks, the weighting factors may be suitably controlled regardless of the levels of the received signals and the levels of the demodulated signals. Therefore, the resistance of detection to weakness of wanted waves and the like is relatively strong.

A third aspect of the present invention is the diversity reception device of the first aspect, in which each branch further includes a calculation section that calculates a ratio between the level of the correlation signal at a first time position detected by the time position detector and an integral value of the level of the correlation signal from a second time position detected prior to the first time position to the first time position, wherein the controller controls the weighting factor of the multiplication section of the each branch on the basis of the respective ratios calculated by the calculation sections of the respective branches.

In the present aspect, the weighting factor is controlled using the ratio between the level of the correlation signal at the time position at which the correlation signal level is at a peak and the integral of the level of the correlation signal from the peak position one cycle before that peak position to that peak position. Therefore, the weighting factors may be suitably controlled regardless of the levels of the received signals and the levels of the demodulated signals. Accordingly, the resistance of detection to weakness of wanted waves and the like is stronger. Here, the ratio between the peak level and the integral value is found regardless of whether or not the correlation section generates a correlation signal that is related to the level of the received signal. Therefore, the weighting factors may be controlled without being affected by levels of the received signals.

In the second aspect, the controller may perform control such that the weighting factor is larger for branches at which the calculated difference is smaller.

In the third aspect, the calculation section of each of the branches may calculate the ratio of the integral value to the level, and the controller may perform control such that the weighting factor is larger for branches at which the calculated ratio is smaller.

In the third aspect, the calculation section of each of the branches may calculate the ratio of the level to the integral value, and the controller may perform control such that the weighting factor is larger for branches at which the calculated ratio is larger.

In the first aspect, the controller may perform control such that the weighting factor is larger for branches at which the level of the correlation signal at the time position detected by the time position detector is larger.

In the second and third aspects, the controller may control the weighting factor in accordance with respective comparison results of comparing the calculated differences of the respective branches with at least one pre-specified threshold value.

In the first aspect, the controller may control the weighting factor in accordance with respective comparison results of comparing the levels of the correlation signals at the time positions detected by the time position detectors of the respective branches with at least one pre-specified threshold value.

In the second aspect, the controller may compare the respective calculated differences of the respective branches with a pre-specified threshold value and, if all of the differences are less than or equal to the threshold value, may perform control such that the weighting factors of the branches are equal and, if at least one of the differences is greater than the threshold value, may perform control such that the weighting factor is larger for branches at which the difference is smaller.

In the third aspect, the calculation section of each of the branches may calculate the ratio of the integral value to the level, and the controller may compare the respective calculated ratios of the respective branches with a pre-specified threshold value and, if all of the ratios are less than or equal to the threshold value, may perform control such that the weighting factors of the branches are equal and, if at least one of the ratios is greater than the threshold value, may perform control such that the weighting factor is larger for branches at which the difference is smaller.

In the third aspect, the calculation section of each of the branches may calculate the ratio of the level to the integral value, and the controller may compare the respective calculated ratios of the respective branches with a pre-specified threshold value and, if all of the ratios are greater than the threshold value, may perform control such that the weighting factors of the branches are equal and, if at least one of the ratios is less than or equal to the threshold value, may perform control such that the weighting factor is larger for branches at which the ratio is larger.

In the first aspect, the controller may compare the respective levels of the correlation signals at the time positions detected by the time position detectors of the respective branches with a pre-specified threshold value and, if all of the correlation signal levels are greater than the threshold value, may perform control such that the weighting factors of the branches are equal and, if at least one of the correlation signal levels is less than or equal to the threshold value, may perform control such that the weighting factor is larger for branches at which the correlation signal level is larger.

A fourth aspect of the present invention is a diversity reception method of diversity-receiving through plural branches, the method including: at each branch, generating a correlation signal that represents one of a correlation between a received signal and a delayed signal in which the received signal is delayed or a correlation between the received signal and a reference signal, a level of the correlation signal being unrelated to levels of the received signal; detecting time positions at which the level of the generated correlation signal is at peaks; and, in accordance with the respective levels of the correlation signals at the detected time positions of the respective branches, applying respective weightings to and combining demodulated signals in which the received signals of the respective branches are demodulated.

The present aspect operates in the same manner as the first aspect. Therefore, the weighting factors may be suitably controlled regardless of levels of the received signals and levels of the demodulated signals.

A fifth aspect of the present invention is the diversity reception method of the fourth aspect, further including: detecting a time interval between two successive detected time positions, for every two successive time positions; and calculating a difference from an ideal time interval for each of the detected time intervals, wherein the weightings are applied in accordance with the respective calculated differences of the respective branches.

The present aspect operates in the same manner as the second aspect. Therefore, the weighting factors may be suitably controlled regardless of the levels of the received signals and the levels of the demodulated signals.

A sixth aspect of the present invention is the diversity reception method of the fourth aspect, further including calculating a ratio between the level of the correlation signal at a first detected time position and an integral value of the level of the correlation signal from a second time position detected prior to the first time position to the first time position, wherein the weightings are applied in accordance with the respective calculated ratios of the respective branches.

The present aspect operates in the same manner as the third aspect. Therefore, the weighting factors may be suitably controlled regardless of the levels of the received signals and the levels of the demodulated signals.

According to the present aspects as described above, in diversity reception with a plural number of branches, demodulated signals of the branches may be combined with suitable weightings.

BRIEF DESCRIPTION OF THE DRAWINGS

Exemplary embodiments of the present invention will be described in detail based on the following figures, wherein.

DETAILED DESCRIPTION

-First Exemplary Embodiment-

Figure 1:
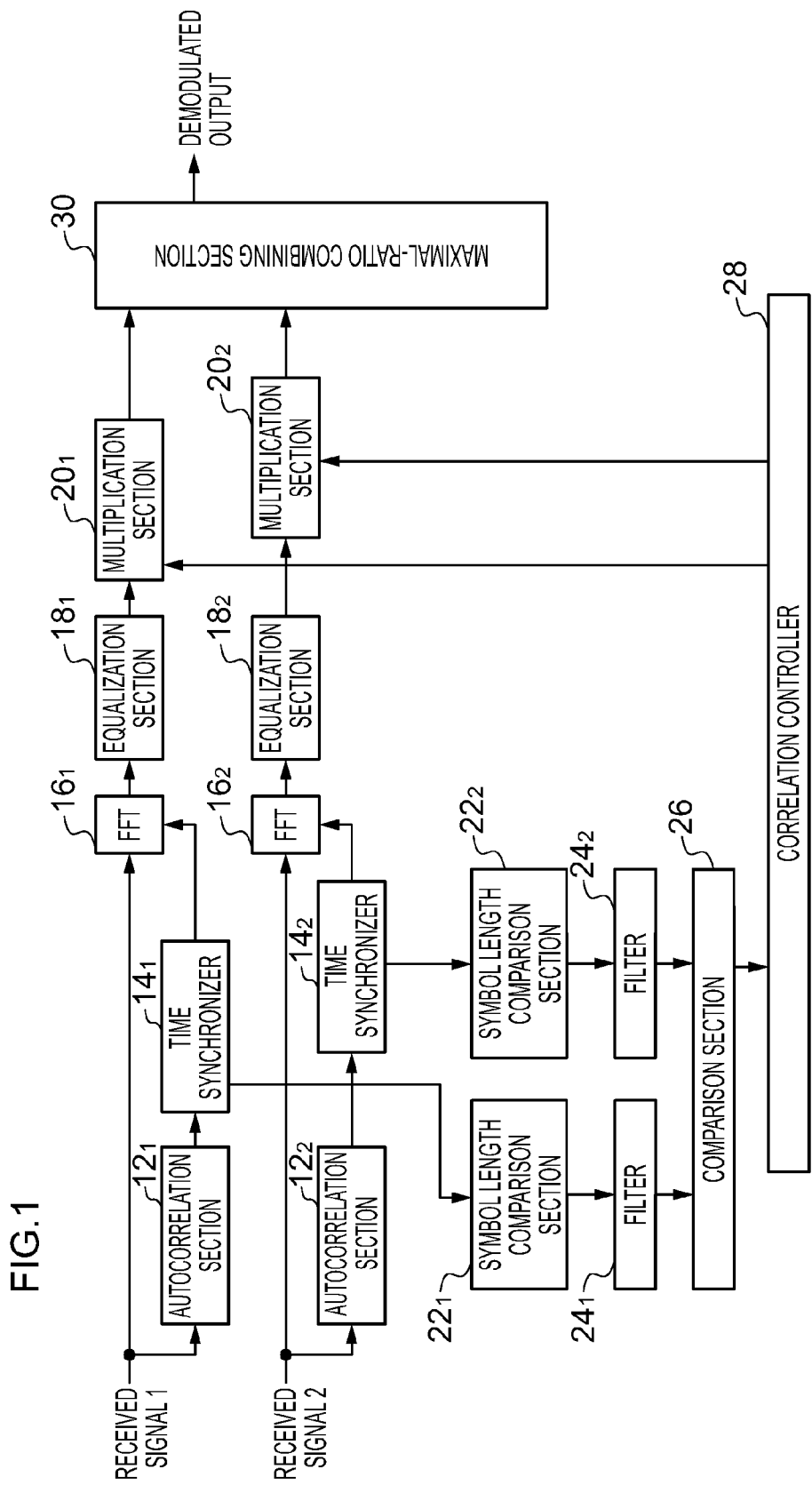
FIG. 1 is a diagram illustrating structure of a diversity reception device relating to a first exemplary embodiment.

FIG. 1 is a diagram illustrating structure of a diversity reception device relating to a first exemplary embodiment, which diversity-receives orthogonal frequency division multiplexing (OFDM) signals. The diversity reception device of the present exemplary embodiment is described as being a device that includes two branches, a first branch and a second branch. Herein, processing sections (reception systems) for processing received signals that are provided in correspondence with respective antennas are referred to as branches.

The diversity reception device relating to the present exemplary embodiment is provided, at each branch, with an autocorrelation section 12, a time synchronizer 14, a fast Fourier transform section (FFT) 16, an equalization section 18, a multiplication section 20, a symbol length comparison section 22, and a filter 24. In FIG. 1, in order to distinguish between structural elements of the first branch and structural elements of the second branch, a subscript 1 is appended to the reference numbers for structural elements corresponding with the first branch and a subscript 2 is appended to the reference numbers for structural elements corresponding with the second branch. Because the two branches perform the same operations, descriptions hereinafter are given without distinguishing therebetween and with the subscripts omitted. The diversity reception device relating to the present exemplary embodiment is also provided with a comparison section 26, a correlation controller 28 and a maximal-ratio combining section 30.

An analog OFDM signal received by an unillustrated tuner is synchronized with a sampling clock signal, sampled at a predetermined frequency and converted to a digital signal, and the resultant received signal is input to the autocorrelation section 12. In FIG. 1, the received signal of the first branch is shown as received signal 1 and the received signal of the second branch is shown as received signal 2. Each autocorrelation section 12 finds a correlation between the input received signal and a delayed signal in which the received signal is delayed by an effective symbol period (an autocorrelation), generates a correlation signal representing the correlation, and outputs the correlation signal to the time synchronizer 14.

Figure 2:
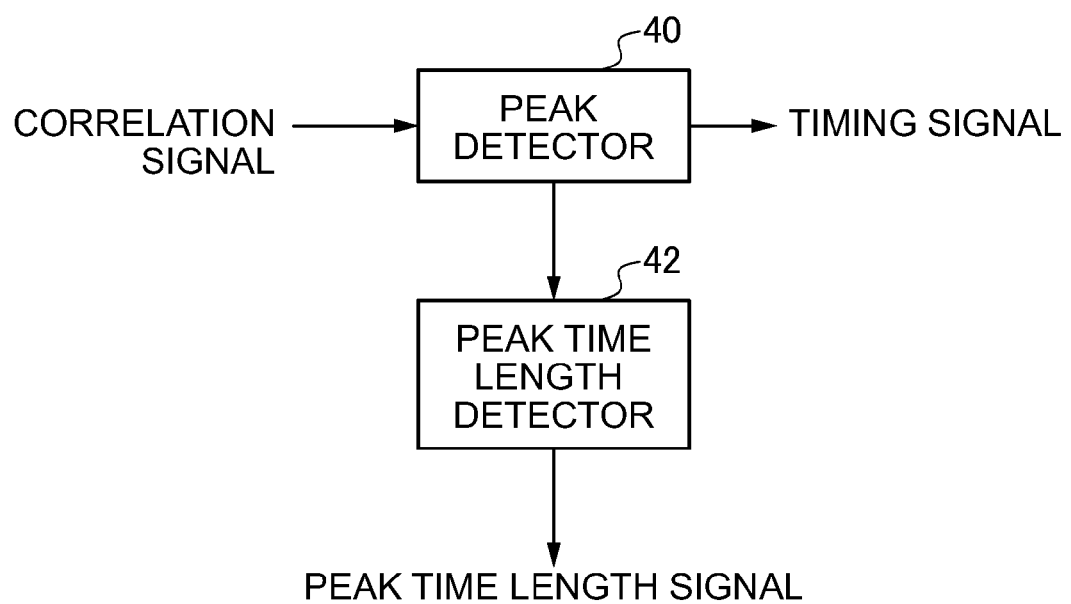
FIG. 2 is a structural diagram illustrating structure of a time synchronizer of each of branches relating to the first exemplary embodiment.

FIG. 2 is a diagram illustrating structure of the time synchronizer 14 of each branch. The time synchronizer 14 is provided with a peak detector 40 and a peak time length detector 42. The peak detector 40 outputs a timing signal, for extracting an effective symbol signal from the received signal, to the FFT 16 and to the peak time length detector 42. Specifically, the peak detector 40 detects a timing in each symbol period at which the level of the correlation signal received from the autocorrelation section 12 is at a peak (which may hereinafter be referred to as a time position at a peak or as a peak position), and inputs a timing signal representing these timings to the FFT 16 and to the peak time length detector 42. The peak time length detector 42 finds a time interval (hereinafter referred to as the peak time length) from a preceding peak position (one cycle before) to the current peak position, on the basis of the timing signal input from the peak detector 40, and inputs a peak time length signal representing the peak time lengths to the symbol length comparison section 22.

The timing signal from the time synchronizer 14 and the received signal are input to the FFT 16. On the basis of the input timing signal, the FFT 16 removes guide periods from the received signal and extracts signals of effective symbol periods, and applies fast Fourier transform processing thereto.

At the equalization section 18, channel estimation (an estimation of propagation path characteristics) is carried out on the basis of the fast Fourier transformed signal from the FFT 16. Equalization processing that corrects amplitude, phase and the like of the fast Fourier transformed signal is carried out in accordance with the propagation path characteristics, and the signal is demodulated. After the equalization processing, the demodulated signal is input to the multiplication section 20.

The multiplication section 20 multiplies a weighting factor (hereinafter referred to as a gain) input from the correlation controller 28, which is described below, with the modulated signal input from the equalization section 18, and outputs the result to the maximal-ratio combining section 30.

The signals output from the multiplication sections 20 of the respective branches are input to the maximal-ratio combining section 30. The maximal-ratio combining section 30 adds (combines) the input signals and thus generates and outputs a final demodulated signal.

When the peak time length signal is input from the time synchronizer 14, the symbol length comparison section 22 compares peak time lengths represented by the peak time length signal with an ideal time length of one symbol, finds differences therebetween, and outputs a difference signal, representing values for which the differences are converted to absolute values, to the filter 24. Herein, the ideal one-symbol time length value is specified beforehand at the symbol length comparison section 22 of each branch.

The filter 24 filters, smoothes and stabilizes the difference signal input from the symbol length comparison section 22. After being smoothed by the filter 24, the difference signal is input to the comparison section 26.

The difference signals from the filters 24 of the respective branches are input to the comparison section 26. The comparison section 26 performs comparisons of the difference signals from the filters 24 of the respective branches, and inputs comparison results to the correlation controller 28.

Figure 4:
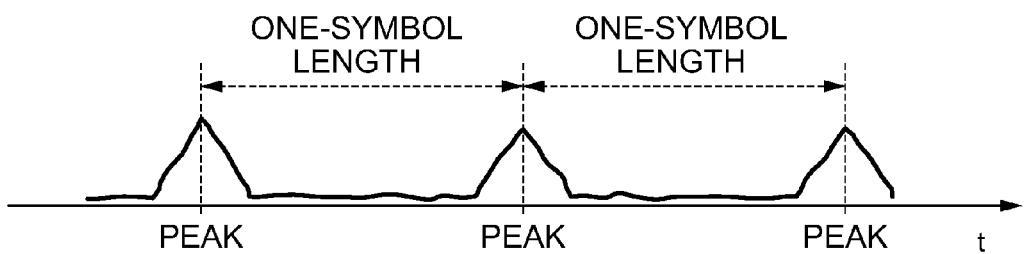
FIG. 4 is a diagram illustrating an example of a correlation signal when a received signal is excellent.
Figure 5:
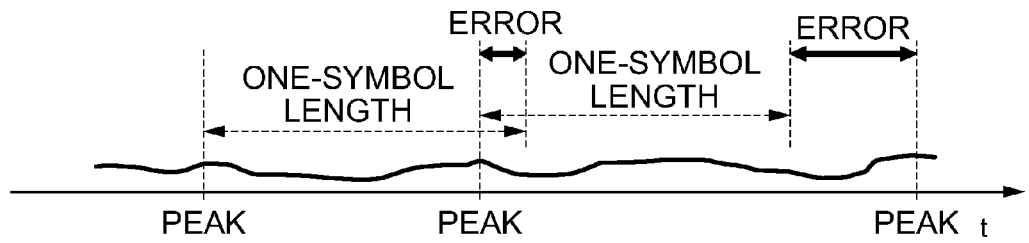
FIG. 5 is a diagram illustrating an example of a correlation signal when a received signal is unstable or undetectable.

On the basis of the comparison results input from the comparison section 26, the correlation controller 28 applies gains reflecting the comparison results to the smoothed signals that are the demodulated signals of the respective branches. That is, gains reflecting the comparison results at the comparison section 26 are input to the multiplication sections 20 of the respective branches. In essence, the correlation controller 28 performs control so as to increase (raise) the gain of a branch on which stable autocorrelation is obtained, as illustrated in FIG. 4, and reduce (lower) the gain of a branch at which autocorrelation is unstable or autocorrelation cannot be obtained, as illustrated in FIG. 5.

A correlation signal representing autocorrelation exhibits peaks with a period that is closer to the ideal symbol time length where the quality of the received signal is better. In contrast, where the received signal is unstable, there is more noise and the time positions of peaks in the correlation signal are less stable. Similarly, when there is a multipath at which the reception quality is poor, the time positions of the peaks are unstable. In the present exemplary embodiment, this characteristic is utilized to set the gains of the respective branches.

Next, a concrete example of operation of the comparison section 26 and the correlation controller 28 is described in detail.

In the present exemplary embodiment, each of the following (A) to (E) is found by the comparison section 26 from the output (filter output) from the filter 24 of each branch.

(A) The difference between filter output of the first branch and filter output of the second branch (B) Which is larger (magnitude relation) of the filter output from the first branch and a pre-specified reference value 1

(C) Which is larger (magnitude relation) of the filter output from the second branch and the reference value 1

(D) Which is larger (magnitude relation) of the filter output from the second branch and a pre-specified reference value 2

(E) Which is larger (magnitude relation) of the filter output from the first branch and the reference value 2

This reference value 1 and reference value 2 are threshold values for judging errors between the detected peak time lengths and the ideal one-symbol time length. Of reference value 1 and reference value 2, reference value 1 is smaller than reference value 2. The values of reference value 1 and reference value 2 are set in advance at the comparison section 26.

The comparison section 26 inputs (A) to (E) described above to the correlation controller 28 as comparison results.

Figure 3:
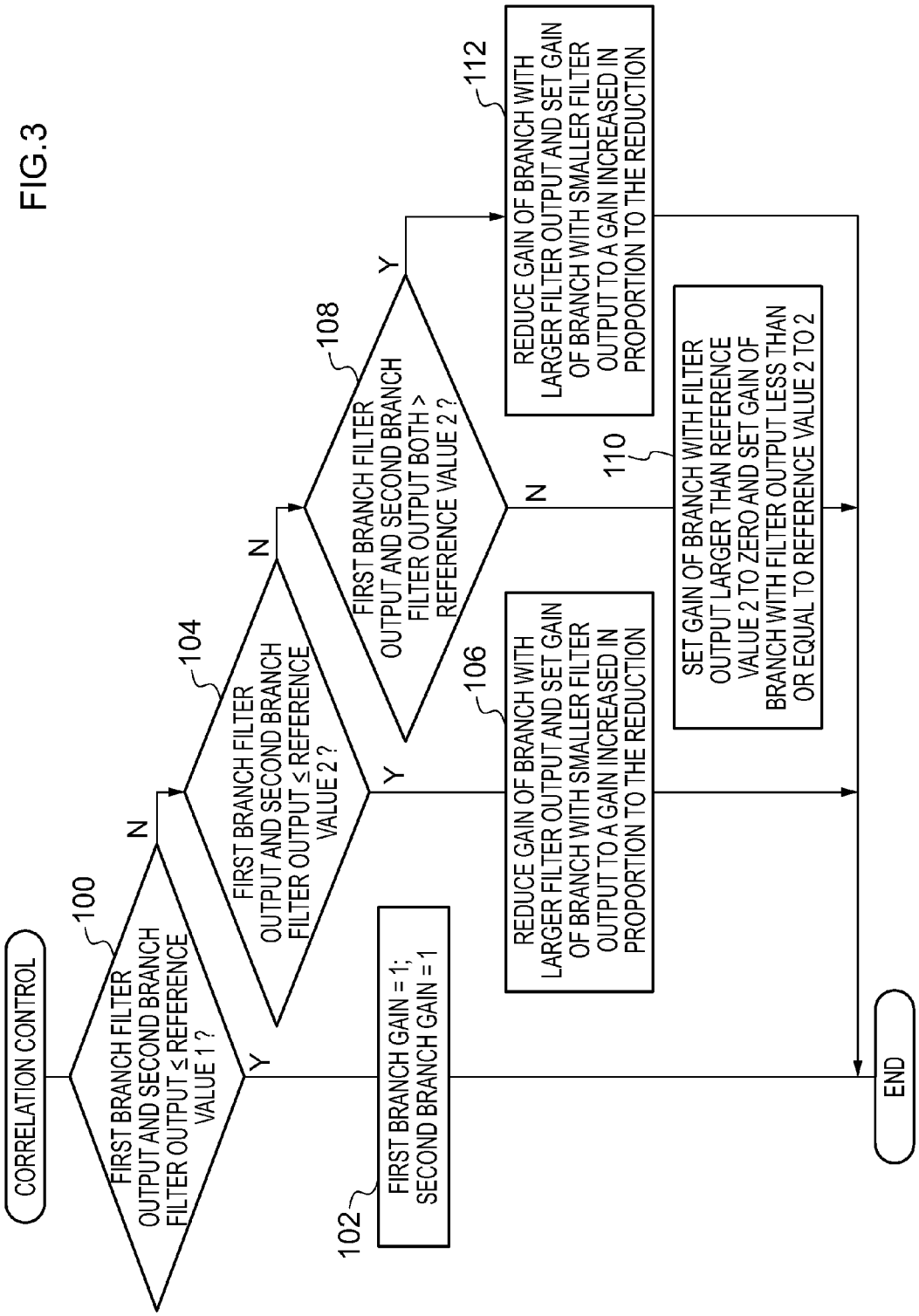
FIG. 3 is a flowchart describing an example of gain control by a correlation controller relating to the first exemplary embodiment.

The correlation controller 28 uses the input comparison results (A) to (E) to control the gains applied to the multiplication sections 20. Next, an example of gain control by the correlation controller 28 is described using the flowchart illustrated in FIG. 3.

If both the filter output from the first branch and the filter output from the second branch are less than or equal to reference value 1 (Yes in step 100), both the first branch and the second branch are in excellent receiving conditions, and the gains of the first branch and the second branch are made equal. The respective gains are set to 1 in this case (step 102).

If one or both of the filter output from the first branch and the filter output from the second branch is greater than reference value 1 (No in step 100), and if both the filter output from the first branch and the filter output from the second branch are less than or equal to reference value 2 (Yes in step 104), the gain of the branch with the larger filter output is reduced and the gain of the branch with the smaller filter output is set to a gain that is increased in proportion to this reduction (increased by the amount of this reduction) (step 106).

For example, if one gain is lowered by 2 dB, the other gain is raised by 2 dB. As another example, if the standard gain is 1 (actual value), one gain is set to 0.5, the other gain is set to 1.5. Here, how much the gain of the branch with the larger filter output is lowered by (in other words, how much the gain of the branch with the smaller filter output is raised by) is determined in accordance with the size of the difference between the two filter outputs. The gain reduction amount and increase amount may be larger where the difference between the filter outputs is larger.

If both of the first branch and the second branch are greater than reference value 1 and less than or equal to reference value 2 (i.e., the receiving conditions of both are unstable), the gain is controlled in accordance with the magnitude relation of the two filter outputs (which of the two filter outputs is larger), as same as in the case in which one of the first branch and the second branch is less than or equal to reference value 1 and the other is greater than reference value 1 but less than or equal to reference value 2 (i.e., only one of the branches is in an excellent receiving condition).

If there is no difference between the filter outputs of the first branch and the second branch, similarly to step 102, the gains of both the first branch and the second branch may be set to 1.

If one of the filter output of the first branch and the filter output of the second branch is greater than reference value 2 and the other is less than or equal to reference value 2 (No in step 100, No in step 104, and No in step 108), the gain of the branch whose filter output is greater than reference value 2 is set to 0, and the gain of the branch whose filter output is less than or equal to reference value 2 is set to 2. That is, the branch whose filter output is greater than reference value 2 is assumed to be a branch whose receiving condition is unstable and signal quality is extremely low. Accordingly, the gain of this branch is set to zero and the received signal received by this branch is not used (step 110).

If both the filter output of the first branch and the filter output of the second branch are greater than reference value 2 (No in step 100, No in step 104, and Yes in step 108), similarly to step 106, the gain of the branch whose filter output is larger is reduced and the gain of the branch whose filter output is smaller is set to a gain that is increased in proportion to this reduction (step 112). If there is no difference between the filter outputs of the first branch and the second branch, then, similarly to step 102, the gains of both the first branch and the second branch may be set to 1. In this case, the gains may be controlled in accordance with which of the filter outputs of the first branch and the second branch is larger. However, because the receiving conditions of both the first branch and the second branch are unstable and the signal qualities are very poor, the gains of both branches may be set to zero and neither of the two branches used.

As described above, in essence in this exemplary embodiment, control is performed such that the gains of the branches are equal if all of the filter outputs are less than or equal to reference value 1, and otherwise control is performed such that gains are larger where filter outputs are smaller. The control logic of the correlation controller 28 described here is an example; the gains may be controlled using the comparison results of the preceding comparison section 26 in accordance with other combinations thereof. The comparisons of the preceding comparison section 26 are also an example and are not limited to the above.

In the exemplary embodiment described above, an example is described in which the gains are controlled by comparing the filter outputs with two reference values, reference value 1 and reference value 2. However, embodiments are not limited to this and there may be one reference value, or there may be three or more. For example, only reference value 1 may be used, with reference value 2 not being used. In this case, the values of (A) to (C) may be found by the comparison section 26, and the correlation controller 28 may control the gains as described below.

If both the filter output of the first branch and the filter output of the second branch are less than or equal to reference value 1, both of the first branch and the second branch are taken to have excellent receiving conditions and, similarly to step 102, the gains of the first branch and the second branch are made equal (in this case, both being set to a gain of 1).

If one of the filter output of the first branch and the filter output of the second branch is greater than reference value 1, the gain of the branch whose filter output is larger is reduced, and the gain of the branch whose filter output is smaller is increased in proportion to this reduction. As a different kind of control, the gain of the branch whose filter output is greater than reference value 1 may be set to zero and the gain of the branch whose filter output is less than or equal to reference value 1 may be set to 2.

If both the filter output of the first branch and the filter output of the second branch are greater than reference value 1, the gain of the branch whose filter output is larger may be reduced and the gain of the branch whose filter output is smaller may be set to a gain that is increased in proportion to this reduction, or the gains of both branches may be set to zero and neither of the two branches used.

Furthermore, in the above descriptions the gains are controlled from comparisons with at least one reference value. However, the gains may be controlled only from which of the filter outputs is larger, without comparison with any reference values. Specifically, for example, the gain of the branch whose filter output is larger is reduced and the gain of the branch whose filter output is smaller is set to a gain that is increased in proportion to this reduction, or the like.

As described above, in the present exemplary embodiment the gain of each branch is set using the peak time length of a correlation signal representing autocorrelation, rather than using the output level (reception level) of the received signal received by a branch or the power level of a demodulated signal after smoothing processing by the equalization section 18. Therefore, even if unwanted waves are mixed in at a tuner and a reception level is high, suitable gains may be provided regardless of this reception level.

Even if the autocorrelation section 12 includes a configuration for autocorrelation processing such that the correlation peak values of the correlation signal are affected by reception level, the peak values of the correlation signal are not considered in the present exemplary embodiment. Therefore, only the periodicity of the autocorrelation need be judged, without regard to reception level. Therefore, even if unwanted waves are mixed in at a tuner and a reception level is high, suitable gains may be provided regardless of this reception level.

As illustrated in the above-described step 110, the gain distribution is altered in a stable receiving condition (FIG. 4) and in a receiving condition that is unstable and whose signal quality is assumed to be very low (FIG. 5), and further the gains are controlled such that the signal amplitude of the branch with the unstable reception condition is set to zero, and the signal amplitude of the branch with the stable receiving condition is set to 2. Thus, equalized output resulting from a receiving condition that is subject to deterioration may be eliminated.

In the present exemplary embodiment, the maximal-ratio combining result of the maximal-ratio combining section 30 is set to a constant output level by setting the sum of the gains of the first branch and the second branch to 2, but embodiments are not limited to this. For example, if an adjustment circuit that adjusts amplitude is provided succeeding the maximal-ratio combining section 30, amplitudes may be fitted to a constant output level by this adjustment circuit. In this case, there is no need to set the sum of the gains always to 2 in order for the maximal-ratio combining results of the maximal-ratio combining section 30 to be at a constant output level.

If this adjustment circuit is provided succeeding the maximal-ratio combining section 30, the gains may be controlled in accordance with, for example, only comparison results of comparing reference values with the respective filter outputs. For example, the gain of a branch whose filter output is less than or equal to a reference value 1 is set to a pre-specified value $\alpha$, the gain of a branch whose filter output is greater than reference value 1 and less than or equal to a reference value 2 is set to a pre-specified value $\beta$, and the gain of a branch whose filter output is greater than reference value 2 is set to a pre-specified value $\gamma$, or the like. The sizes of $\alpha$, $\beta$ and $\gamma$ are set such that $\alpha > \beta > \gamma$.

-Second Exemplary Embodiment-

Figure 6:
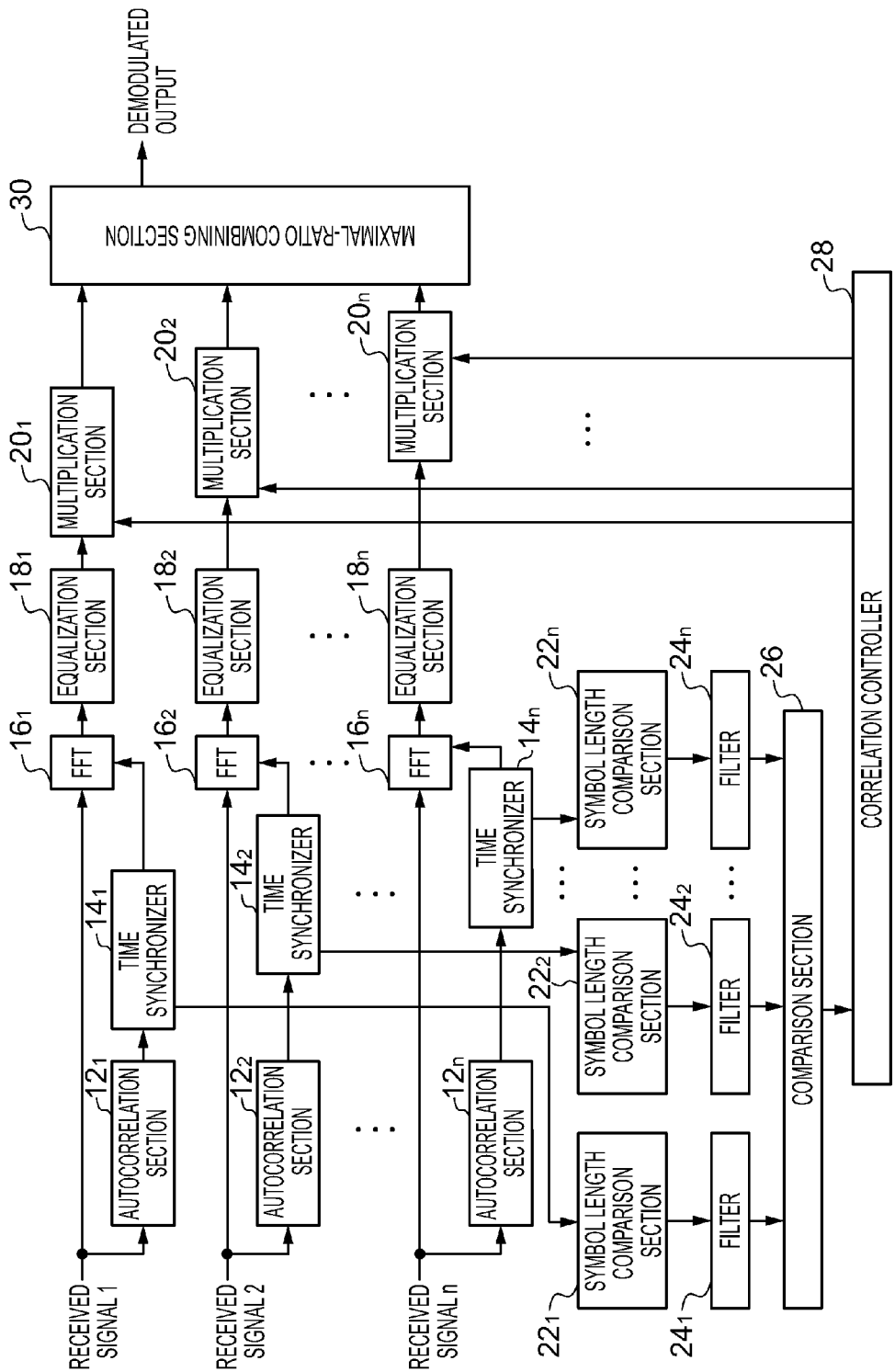
FIG. 6 is a diagram illustrating structure of a diversity reception device relating to a second exemplary embodiment.

FIG. 6 illustrates structure of a diversity reception device of a second exemplary embodiment. In the diversity reception device of the present exemplary embodiment, the diversity reception device with two branches that is illustrated in the first exemplary embodiment is generalized to a diversity reception device with n branches (n being an integer that is at least two). The structures corresponding to each branch are the same as in the first exemplary embodiment. A concrete example of operation of the comparison section 26 and correlation controller 28 relating to the present exemplary embodiment is now described in detail.

The comparison section 26 relating to the present exemplary embodiment finds each of the following (A) to (D) from the filter outputs of the branches.

(A) The smallest value of the filter outputs of all the branches (hereinafter referred to as the smallest filter output)

(B) Respective differences between the smallest filter output and the other filter outputs (C) Which is larger (magnitude relation) of the filter output from each branch and a pre-specified reference value 1

(D) Which of the filter output from each branch and a pre-specified reference value 2 is larger (magnitude relation between the filter output from each branch and a pre-specified reference value 2)

The same as in the first exemplary embodiment, reference value 1 and reference value 2 are threshold values for judging errors between the detected peak time lengths and the ideal one-symbol time length. Of reference value 1 and reference value 2, reference value 1 is smaller than reference value 2. The values of reference value 1 and reference value 2 are set in advance at the comparison section 26.

The comparison section 26 inputs the respective (A) to (D) described above to the correlation controller 28 as comparison results.

Figure 7:
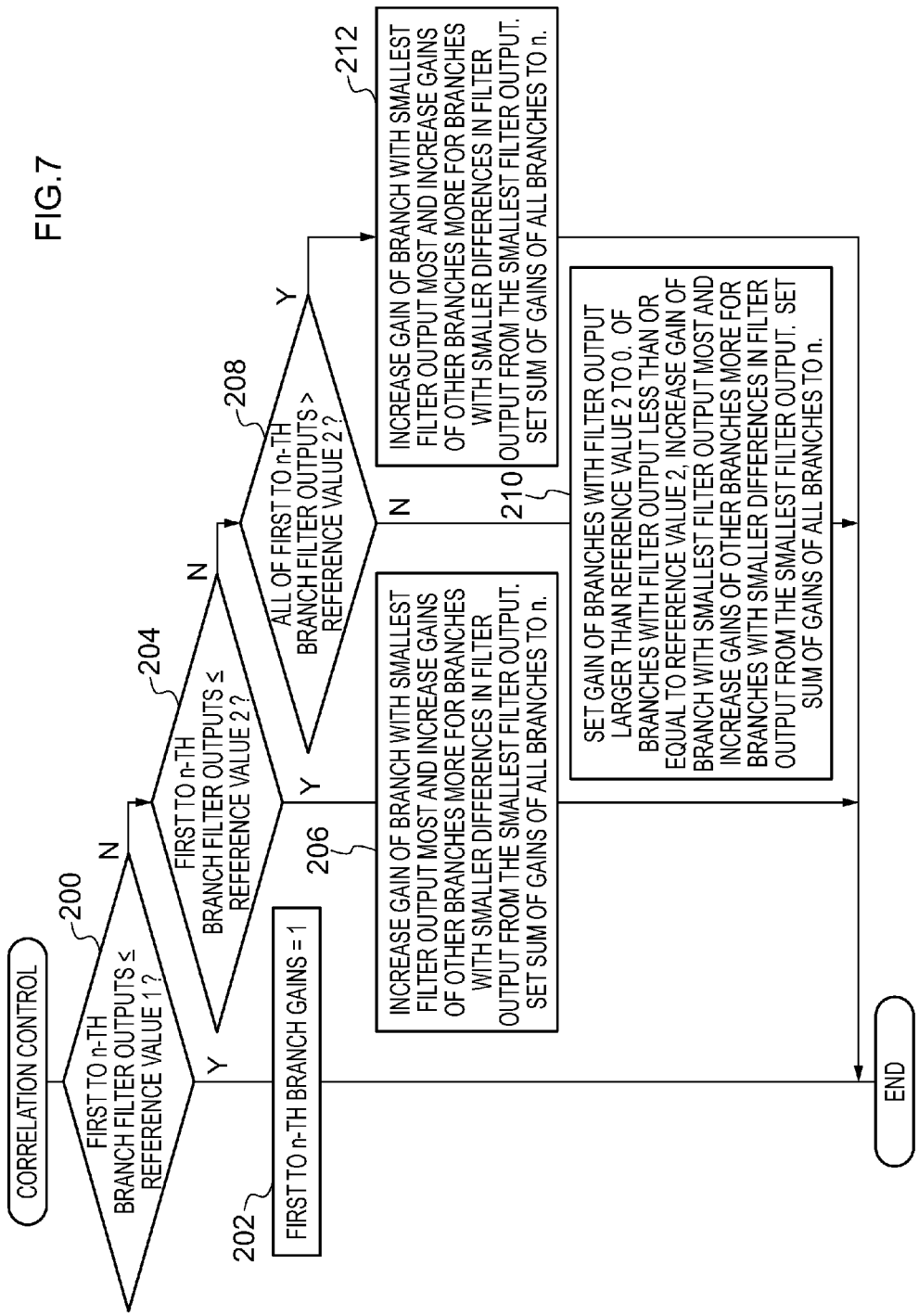
FIG. 7 is a flowchart describing an example of gain control by a correlation controller relating to the second exemplary embodiment.

The correlation controller 28 uses the input comparison results (A) to (D) to control the gain of each branch. Next, an example of gain control by the correlation controller 28 is described using the flowchart illustrated in FIG. 7.

If all of the filter outputs from the first to n-th branches are less than or equal to reference value 1 (Yes in step 200), all of the branches are in excellent receiving conditions, and the gains of all of the first to n-th branches are made equal. The respective gains are set to 1 in this case (step 202).

If any or all of the filter outputs from the first to n-th branches is greater than reference value 1 (No in step 200) and all of the filter outputs of the first to n-th branches are less than or equal to reference value 2 (Yes in step 204), the gain of the branch with the smallest filter output is increased most and, for the other branches, the gains of the branches are set larger where the difference in filter output from the smallest filter output is smaller. The sum of the gains of all the branches is n (step 206).

If any or all of the filter outputs from the first to n-th branches is greater than reference value 1 (No in step 200) and the filter output of at least one but less than n of the filter outputs from the first to n-th branches is less than or equal to reference value 2 (No in step 204 and No in step 208), the gains of the branches whose filter output is greater than reference value 2 are set to zero. Of the branches whose filter output is less than or equal to reference value 2, the gain of the branch with the smallest filter output is increased most and, for the others of these branches, the gains of the branches are set larger where the difference in filter output from the smallest filter output is smaller. The sum of the gains of all the branches is n (step 210).

If all of the filter outputs from the first to n-th branches are greater than reference value 2 (No in step 200, No in step 204, and Yes in step 208), the gain of the branch with the smallest filter output is increased most and, for the other branches, the gains of the branches are set larger where the difference in filter output from the smallest filter output is smaller. The sum of the gains of all the branches is n (step 212). In this case, the gains are controlled in accordance with the magnitude relationship between the filter outputs of the branches. However, because the receiving conditions of all of the branches are unstable and the signal qualities are very poor, the gains of all the branches may be set to zero and none of the branches used.

As described above, in essence in this example, control is performed such that the gains of the branches are equal if all of the filter outputs are less than or equal to reference value 1, and otherwise control is performed such that gains are larger for smaller filter outputs. The control logic of the correlation controller 28 described here is an example; the gains may be controlled using the comparison results of the preceding comparison section 26 in accordance with other combinations thereof. The comparisons of the preceding comparison section 26 are also an example and are not limited to the above.

For example, in the exemplary embodiment described above, an example is described in which the gains are controlled by comparing the filter outputs with two reference values, reference value 1 and reference value 2. However, embodiments are not limited to this and there may be one reference value, or there may be three or more. For example, only reference value 1 may be used, with reference value 2 not being used. In this case, the values of (A) to (C) may be found by the comparison section 26, and the correlation controller 28 may control the gains as described below.

If all of the filter outputs from the first to n-th branches are less than or equal to reference value 1, all of the branches are taken to have excellent receiving conditions and, similarly to step 202, the gains of all of the branches are set to 1.

If, of the filter outputs from the first to n-th branches, the filter output of at least one but less than n of the branches is greater than reference value 1, the gain of the branch with the smallest filter output is increased most and, for the other branches, the gains of the branches are set larger where the difference in filter output from the smallest filter output is smaller. The sum of the gains of all the branches is n.

If all of the filter outputs from the first to n-th branches are greater than reference value 1, the gain of the branch with the smallest filter output is increased most and, for the other branches, the gains of the branches are set larger where the difference in filter output from the smallest filter output is smaller. The sum of the gains of all the branches is n. Alternatively, the gains of all the branches may be set to zero and none of the branches used.

Furthermore, in the above description the gains are controlled from comparisons with at least one reference value. However, the gains may be controlled only from which of the filter outputs is larger than which, without comparison with any reference value. Specifically, for example, the gain of the branch with the smallest filter output is increased most and, for the other branches, the gains of the branches are set larger where the difference in filter output from the smallest filter output is smaller. Again, the sum of the gains of all the branches is n.

In the above description, the gains are controlled using differences between the smallest filter output and each of the other filter outputs. However, the differences between the smallest filter output and each of the other filter outputs is an example of an index representing size relationships between the filter outputs, and obviously is not a limitation. For example, the comparison section 26 may find the following (a) and (b) instead of the above-mentioned (A) and (B).

(a) The largest value of the filter outputs of all the branches (hereinafter referred to as the largest filter output)

(b) Respective differences between the largest filter output and the other filter outputs In this case, the correlation controller 28 of the above example controls the gains in step 206 and step 212 so as to reduce the gain of the branch with the largest filter output the most and, for the others of the branches, set the gains of the branches larger where the difference in the filter output from the largest filter output is larger, such that the sum of the gains of all the branches is n. The same applies to step 210.

Further yet, the comparison section 26 may find each of the following (A) to (C) from the filter outputs of the branches.

(A) Which is larger than which (magnitude relation) of the filter outputs of all the branches (B) Which is larger of (magnitude relation) the filter output from each branch and a reference value 1

(C) Which is larger of (magnitude relation) the filter output from each branch and a reference value 2

The comparison section 26 inputs the respective (A) to (C) to the correlation controller 28 as comparison results.

Figure 8:
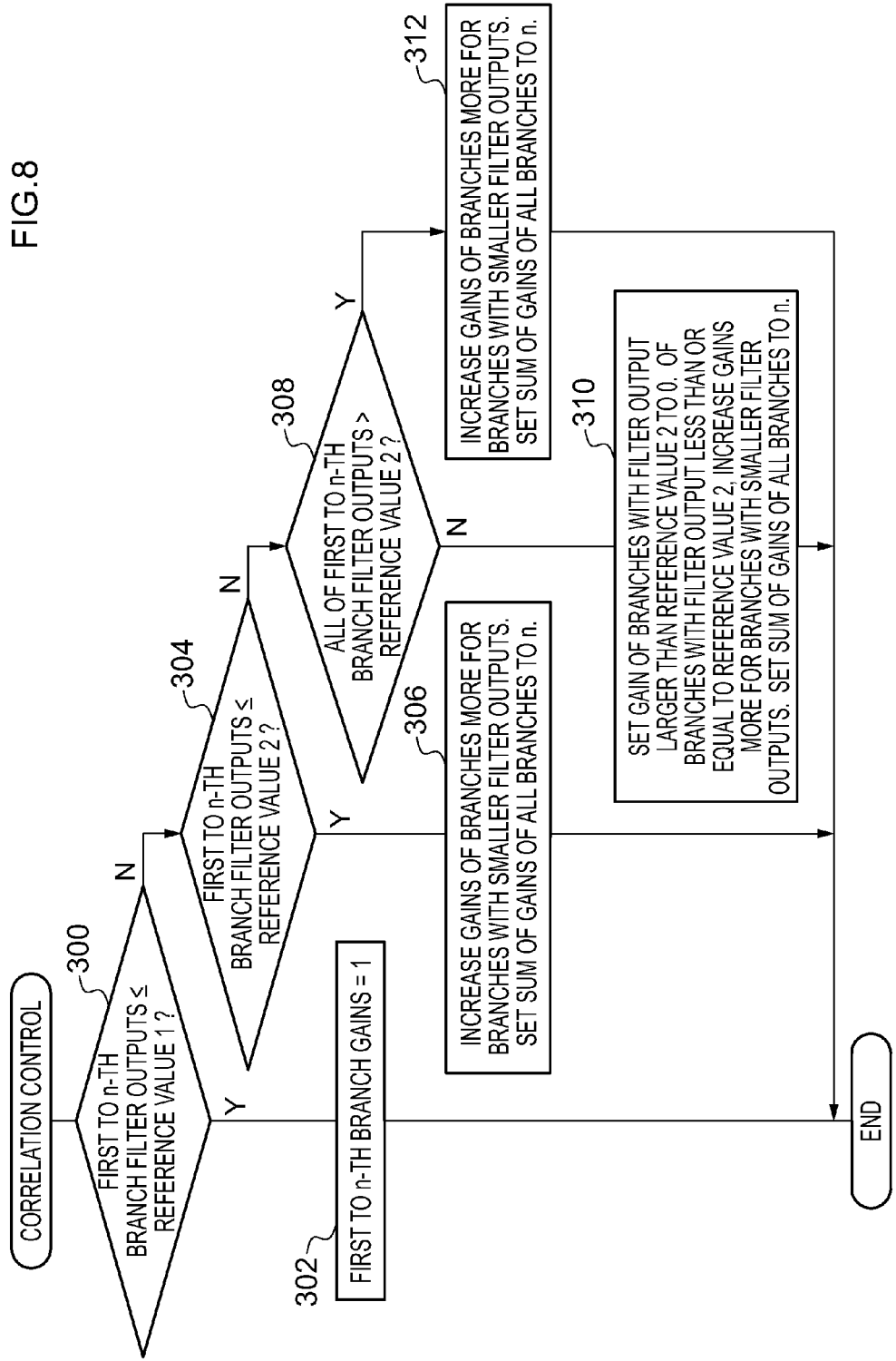
FIG. 8 is a flowchart describing another example of gain control by the correlation controller relating to the second exemplary embodiment.

Next, an example of gain control by the correlation controller 28 in this case is described using the flowchart in FIG. 8.

If all of the filter outputs from the first to n-th branches are less than or equal to reference value 1 (Yes in step 300), all of the branches are in excellent receiving conditions, and the gains of all of the first to n-th branches are set to 1 (step 302).

If any or all of the filter outputs from the first to n-th branches is greater than reference value 1 (No in step 300) and all of the filter outputs of the first to n-th branches are less than or equal to reference value 2 (Yes in step 304), the gains are set to be larger for branches with smaller filter outputs, and the sum of the gains of all the branches is made to be n (step 306).

If any or all of the filter outputs from the first to n-th branches is greater than reference value 1 (No in step 300) and the filter outputs of at least one but less than n of the filter outputs from the first to n-th branches is less than or equal to reference value 2 (No in step 304 and No in step 308), the gains of the branches whose filter output is greater than reference value 2 are set to zero. Of the branches whose filter output is less than or equal to reference value 2, the gains are set to be larger for branches with smaller filter outputs, and the sum of the gains of all the branches is made to be n (step 310).

If all of the filter outputs from the first to n-th branches are greater than reference value 2 (No in step 300, No in step 304, and Yes in step 308), the gains are set to be larger for branches with smaller filter outputs, and the sum of the gains of all the branches is made to be n (step 312). In this case, the gains may be set and used in accordance with the magnitude relation of the filter outputs of the branches. However, because the receiving conditions of all of the branches are unstable and the signal qualities are very poor, the gains of all the branches may be set to zero and none of the branches used.

In the present exemplary embodiment, the maximal-ratio combining result of the maximal-ratio combining section 30 is set to a constant output level by control such that the sum of the gains of the first to n-th branches is n, but embodiments are not limited thereto. For example, if an adjustment circuit that adjusts amplitude is provided succeeding the maximal-ratio combining section 30, amplitudes may be fitted to a constant output level by this adjustment circuit. Accordingly, there is no need to control the sum of the gains such that the maximal-ratio combining results of the maximal-ratio combining section 30 are at a constant output level.

If this adjustment circuit is provided succeeding the maximal-ratio combining section 30, the gains may be controlled in accordance with, for example, only comparison results of comparing one or more reference values with the respective filter outputs. For example, the gain of a branch whose filter output is less than or equal to a reference value 1 is set to a pre-specified value α, the gain of a branch whose filter output is greater than reference value 1 and less than or equal to a reference value 2 is set to a pre-specified value β, and the gain of a branch whose filter output is greater than reference value 2 is set to a pre-specified value γ, or the like. The sizes of α, β and γ are set such that α>β>γ.

In the first and second exemplary embodiments, examples are described in which each time synchronizer 14 includes the peak detector 40 and the peak time length detector 42, and the peak time length detector 42 outputs a peak time length signal based on a timing signal of the peak detector 40 (that is, a timing signal from the peak detector 40 is used to generate the peak time length signal at the peak time length detector 42 instead of only being used for extraction of the effective symbol signals at the FFT 16). However, embodiments are not limited to this. For example, a circuit that generates a timing signal from a correlation signal and outputs the timing signal to the FFT 16, and a circuit that generates a timing signal from the correlation signal, generates a peak time length signal from the timing signal and outputs the peak time length signal to the symbol length comparison section 22 may be provided separately and independently.

-Third Exemplary Embodiment-

Figure 9:
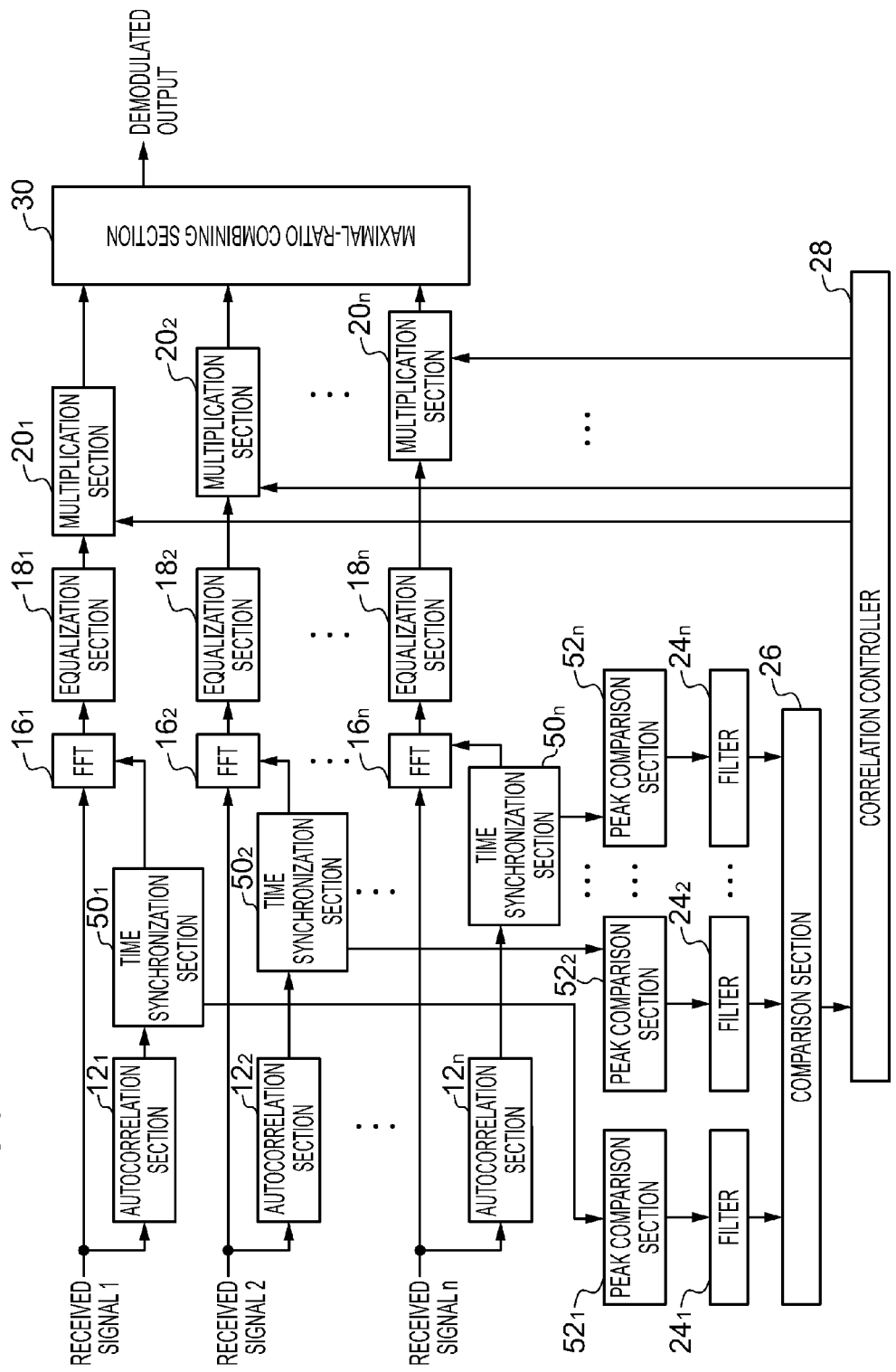
FIG. 9 is a diagram illustrating structure of a diversity reception device of a third exemplary embodiment.

FIG. 9 illustrates structure of a diversity reception device relating to a third exemplary embodiment. The diversity reception device of the present exemplary embodiment includes n branches (n being an integer that is at least two) and controls the gains of the branches using, instead of the peak time length, a ratio between a power level (peak level) at a peak position of the correlation signal and an integral of the level of the correlation signal in a time period from the preceding peak position (one cycle before) to the current peak position.

In FIG. 9, structural elements that are the same as in FIG. 6 are assigned the same reference numerals and descriptions thereof are omitted or simplified. Herebelow, structural elements that differ from FIG. 6 are described in detail.

The diversity reception device relating to the present exemplary embodiment is provided with, at each branch, the autocorrelation section 12, a time synchronizer 50, the FFT 16, the equalization section 18, the multiplication section 20, a peak comparison section 52 and the filter 24. Where the structural elements are to be described distinguishing between the individual branches, a suffix between 1 and n is appended to the reference numerals, and where descriptions are to be given without distinguishing between the branches, the suffix is not appended. The diversity reception device relating to the present exemplary embodiment is also provided with the comparison section 26, The correlation controller 28 and the maximal-ratio combining section 30.

Figure 10:
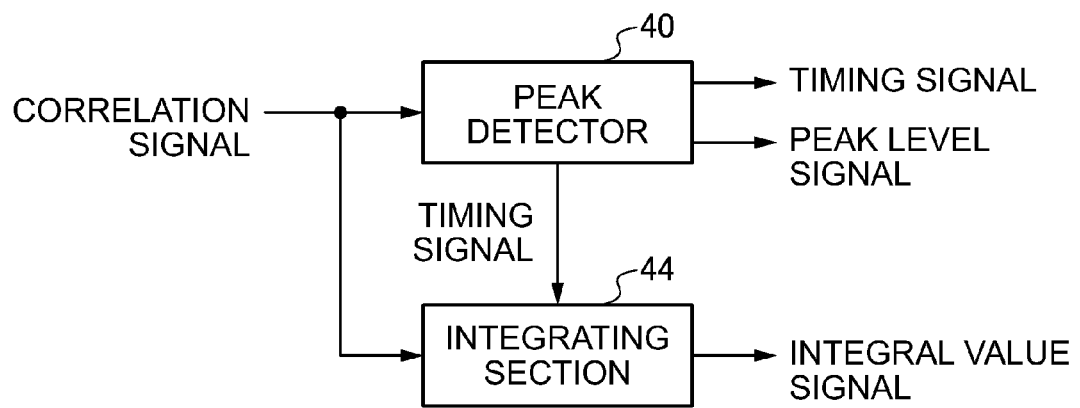
FIG. 10 is a structural diagram illustrating structure of a time synchronizer relating to the third exemplary embodiment.

FIG. 10 is a structural diagram illustrating structure of the time synchronizer 50 of each branch. The time synchronizer 50 is provided with the peak detector 40 and an integrating section 44.

As described in the first exemplary embodiment, the peak detector 40 detects a timing in each symbol cycle at which the level of the correlation signal received from the autocorrelation section 12 is at a peak, and inputs a timing signal representing these timings to the FFT 16 and to the integrating section 44. The peak detector 40 further inputs levels at the time positions that are peaks (peak levels) to the peak comparison section 52.

The correlation signal from the autocorrelation section 12 is input to the integrating section 44 and the timing signal from the peak detector 40 is input to the integrating section 44. The integrating section 44 integrates power levels of the correlation signal in a time period from a preceding peak position (one cycle previously) to a current peak position. An integral value signal representing integral values integrated by the integrating section 44 is input to the peak comparison section 52.

From the input peak level signal and integral value signal, the peak comparison section 52 finds the value of a ratio of the integral value to the peak level. The more excellent the receiving state of a branch, the clearer peaks are exhibited, and thus the smaller the value of this ratio. A signal representing the values of ratios found by the peak comparison section 52 is output to the filter 24.

A concrete example of operation of the comparison section 26 and correlation controller 28 relating to the present exemplary embodiment is the same as the operation described in the second exemplary embodiment, and provides the same effects. That is, gains may be made larger for filter outputs representing values of the ratios that are smaller, or the gains may be controlled in accordance with respective comparison results in which the filter outputs of the branches are compared with one or more pre-specified threshold values (for example, threshold values such as the aforementioned reference value 1 and reference value 2). Further still, the respective filter outputs may be compared with a pre-specified threshold value, the gains of the branches may be set to be equal if the respective filter outputs are lower than the threshold value, and larger gains may be set where filter outputs are smaller if one or more of the filter outputs is greater than the threshold value.

The peak comparison section 52 may also be configured such that the value of a ratio of the peak level to the integral value is found instead of the value of a ratio of the integral value to the peak level, and in this case, the value of the ratio is greater when the branches are in excellent receiving states. Therefore, the gain control at the correlation controller 28 for this case basically performs control so as to increase gains for branches at which the value of the ratio is larger and reduce gains for branches at which the value of the ratio is smaller. An example of this control is described in the following. Of a reference value 3 and a reference value 4 that are used as threshold values in the following, reference value 3 is less than reference value 4.

If all of the filter outputs of the first to n-th branches are greater than reference value 4, all branches are taken to have excellent receiving conditions, and the gains of each of the first to n-th branches are set to 1.

If any or all of the filter outputs from the first to n-th branches is less than or equal to reference value 4 and all of the filter outputs of the first to n-th branches are greater than reference value 3, the gains are set larger for branches where the filter output is larger, and the sum of the gains of all the branches is made to be n.

If any or all of the filter outputs from the first to n-th branches is less than or equal to reference value 4 and the filter outputs of at least one but less than n of the filter outputs from the first to n-th branches is greater than reference value 3, the gains of the branches whose filter output is less than or equal to reference value 3 are set to zero. Of the branches whose filter output is greater than reference value 3, the gains are set larger for branches where the filter outputs are smaller, and the sum of the gains of all the branches is n.

If all of the filter outputs from the first to n-th branches are less than or equal to reference value 3, the gains are set larger for branches where the filter output is smaller, and the sum of the gains of all the branches is n. Because the receiving conditions of all of the branches are unstable and the signal qualities are very poor, the gains of all the branches may alternatively be set to zero and none of the branches used.

This gain control is not limited to this manner. For example, larger gains may be simply set for larger filter outputs without comparisons with reference values. Alternatively the gains may be controlled in accordance with respective comparison results of comparing respective filter outputs of the branches with one or more pre-specified threshold values (for example, threshold values such as the above-mentioned reference value 1 and reference value 2). For example, the gain of a branch whose filter output is less than or equal to reference value 1 is set to a pre-specified value x, the gain of a branch whose filter output is greater than reference value 1 but less than or equal to reference value 2 is set to a pre-specified value y and the gain of a branch whose filter output is greater than reference value 2 is set to a pre-specified value z, or the like. The sizes of x, y and z are set such that x<y<z.

In the present exemplary embodiment, because the ratio between the peak level and the integral value is used, even if the autocorrelation section 12 includes a configuration for autocorrelation in which the correlation signal level is affected by reception level, suitable gains may be provided regardless of reception level. However, if the autocorrelation section 12 includes a configuration that generates a correlation signal whose level is unrelated to the reception level, gains may be controlled using only peak levels rather than finding the ratios of peak levels to integral values. That is, because peak levels are greater when reception levels are more excellent, the same effects as described above may be obtained basically by increasing the gain where the peak level is larger.

More specifically, the gain may be made larger where the peak level is larger at each branch without carrying out comparisons with reference values, or gains may be controlled in accordance with respective comparison results of comparing one or more pre-specified threshold values with respective peak levels. Alternatively, the respective peak levels of the branches may be compared with a pre-specified threshold value and when the respective peak levels are larger than the threshold value, the gains of the branches may be made equal, and when one or more of the peak levels is less than or equal to the threshold value, the gains may be made larger where the peak levels are larger.

The first to third exemplary embodiments are described for a modulation system (OFDM) that may provide correlation values (a correlation signal) from autocorrelation as an example, but embodiments are not limited to these. Even with a modulation system that may not provide autocorrelation, if it is a modulation system in which a pre-specified previously known signal is inserted into the transmission signal at modulation processing intervals at the transmission side and correlation may be obtained by checking expected values of a previously known signal that is prepared beforehand at the reception side (a reference signal) with the received signals, processing similar to that described above may be carried out using a correlation signal representing this correlation, and the same effects can be obtained.

What is claimed is:

1. A diversity reception device comprising:
a plurality branches, each branch including:
a correlation section that generates a correlation signal that represents one of a correlation between a received signal and a delayed signal in which the received signal is delayed or a correlation between the received signal and a reference signal, a level of the correlation signal disregarding a level of the received signal;
a time position detector that detects time positions at which the level of the correlation signal generated by the correlation section is at a peak;
a demodulation section that demodulates the received signal; and
a multiplication section that multiplies a demodulated signal demodulated by the demodulation section with a weighting factor; a time interval detector that detects a time interval between two successive time positions detected by the time position detector, for every two successive time positions; and a calculation section that calculates a difference from an ideal time interval for each of the detected time intervals, a controller that controls the weighting factor of the multiplication section of each branch on the basis of the respective levels of the correlation signals at the time positions detected by the time position detectors of the respective branches; and a combining section that combines, by adding, the respective demodulated signals of the branches subsequent to the demodulated signal of each branch being multiplied with the weighting factor controlled by the controller;

wherein the controller controls the weighting factor of the multiplication section of the each branch on the basis of the respective differences calculated by the calculation sections of the respective branches.

2. The diversity reception device according to claim 1, wherein the controller performs control such that the weighting factor is larger for branches at which the calculated difference is smaller.

3. The diversity reception device according to claim 1, wherein the controller controls the weighting factor in accordance with respective comparison results of comparing the calculated differences of the respective branches with at least one pre-specified threshold value.

4. The diversity reception device according to claim 1, wherein the controller compares the respective calculated differences of the respective branches with a pre-specified threshold value and, if all of the differences are less than or equal to the threshold value, performs control such that the weighting factors of the branches are equal and, if at least one of the differences is greater than the threshold value, performs control such that the weighting factor is larger for branches at which the difference is smaller.

5. A diversity reception device comprising:

a plurality of branches, each branch including:

a correlation section that generates a correlation signal that represents one of a correlation between a received signal and a delayed signal in which the received signal is delayed or a correlation between the received signal and a reference signal, a level of the correlation signal disregarding a level of the received signal;

a time position detector that detects time positions at which the level of the correlation signal generated by the correlation section is at a peak;

a demodulation section that demodulates the received signal; and a multiplication section that multiplies a demodulated signal demodulated by the demodulation section with a weighting factor a calculation section that calculates a ratio between the level of the correlation signal at a first time position detected by the time position detector and an integral value of the level of the correlation signal from a second time position detected prior to the first time position to the first time position;

a controller that controls the weighting factor of the multiplication section of each branch on the basis of the respective levels of the correlation signals at the time positions detected by the time position detectors of the respective branches; and a combining section that combines, by adding, the respective demodulated signals of the branches subsequent to the demodulated signal of each branch being multiplied with the weighting factor controlled by the controller;

wherein the controller controls the weighting factor of the multiplication section of the each branch on the basis of the respective ratios calculated by the calculation sections of the respective branches.

6. The diversity reception device according to claim 5, wherein the calculation section of each of the branches calculates the ratio, and the controller performs control such that the weighting factor is larger for branches at which the calculated ratio is smaller.

7. The diversity reception device according to claim 5, wherein the calculation section of each of the branches calculates the ratio, and the controller performs control such that the weighting factor is larger for branches at which the calculated ratio is larger.

8. The diversity reception device according to claim 5, wherein the controller controls the weighting factor in accordance with respective comparison results of comparing the calculated ratios of the respective branches with at least one pre-specified threshold value.

9. The diversity reception device according to claim 5, wherein the calculation section of each of the branches calculates the ratio of the integral value to the level, and the controller compares the respective calculated ratios of the respective branches with a pre-specified threshold value and, if all of the ratios are less than or equal to the threshold value, performs control such that the weighting factors of the branches are equal and, if at least one of the ratios is greater than the threshold value, performs control such that the weighting factor is larger for branches at which the difference is smaller.

10. The diversity reception device according to claim 5, wherein the calculation section of each of the branches calculates the ratio of the level to the integral value, and the controller compares the respective calculated ratios of the respective branches with a pre-specified threshold value and, if all of the ratios are greater than the threshold value, performs control such that the weighting factors of the branches are equal and, if at least one of the ratios is less than or equal to the threshold value, performs control such that the weighting factor is larger for branches at which the ratio is larger.

11. A diversity reception device comprising:

a plurality of branches, each branch including:

a correlation section that generates a correlation signal that represents one of a correlation between a received signal and a delayed signal in which the received signal is delayed or a correlation between the received signal and a reference signal, a level of the correlation signal disregarding a level of the received signal;

a time position detector that detects time positions at which the level of the correlation signal generated by the correlation section is at a peak;

a demodulation section that demodulates the received signal; and a multiplication section that multiplies a demodulated signal demodulated by the demodulation section with a weighting factor;

a controller that controls the weighting factor of the multiplication section of each branch on the basis of the respective levels of the correlation signals at the time positions detected by the time position detectors of the respective branches; and a combining section that combines, by adding, the respective demodulated signals of the branches subsequent to the demodulated signal of each branch being multiplied with the weighting factor controlled by the controller;

the controller compares the respective levels of the correlation signals at the time positions detected by the time position detectors of the respective branches with a prespecified threshold value and, if all of the correlation signal levels are greater than the threshold value, performs control such that the weighting factors of the branches are equal and, if at least one of the correlation signal levels is less than or equal to the threshold value, performs control such that the weighting factor is larger for branches at which the correlation signal level is larger.

12. A diversity reception method of diversity-receiving through a plurality of branches, the method comprising:

at each branch, generating a correlation signal that represents one of a correlation between a received signal and a delayed signal in which the received signal is delayed or a correlation between the received signal and a reference signal, a level of the correlation signal disregarding a level of the received signal;

detecting time positions at which the level of the generated correlation signal is at a peak;

in accordance with the respective levels of the correlation signals at the detected time positions of the respective branches, applying respective weightings to and combining demodulated signals in which the received signals of the respective branches are demodulated;

detecting a time interval between two successive detected time positions, for every two successive time positions; and calculating a difference from an ideal time interval for each of the detected time intervals, wherein the weightings are applied in accordance with the respective calculated differences of the respective branches.

13. A diversity reception method of diversity-receiving through a plurality of branches, the method comprising:

at each branch, generating a correlation signal that represents one of a correlation between a received signal and a delayed signal in which the received signal is delayed or a correlation between the received signal and a reference signal, a level of the correlation signal disregarding a level of the received signal;

detecting time positions at which the level of the generated correlation signal is at a peak;

in accordance with the respective levels of the correlation signals at the detected time positions of the respective branches, applying respective weightings to and combining demodulated signals in which the received signals of the respective branches are demodulated;

calculating a ratio between the level of the correlation signal at a first detected time position and an integral value of the level of the correlation signal from a second time position detected prior to the first time position to the first time position, wherein the weightings are applied in accordance with the respective calculated ratios of the respective branches.

* * * * *